United States Patent
Naito et al.

(10) Patent No.: US 8,713,108 B2
(45) Date of Patent: Apr. 29, 2014

(54) NAVIGATION SYSTEM AND NAVIGATION APPARATUS

(75) Inventors: Mitsuhiro Naito, Okazaki (JP); Takashi Hayashi, Okazaki (JP)

(73) Assignee: Aisin AW Co., Ltd., Anjo (JP)

(*) Notice: Subject to any disclaimer, the term of this patent is extended or adjusted under 35 U.S.C. 154(b) by 1776 days.

(21) Appl. No.: 10/590,050

(22) PCT Filed: Mar. 18, 2005

(86) PCT No.: PCT/JP2005/005010
§ 371 (c)(1),
(2), (4) Date: Jun. 7, 2007

(87) PCT Pub. No.: WO2005/103623
PCT Pub. Date: Nov. 3, 2005

(65) Prior Publication Data
US 2008/0021633 A1   Jan. 24, 2008

(30) Foreign Application Priority Data
Apr. 22, 2004  (JP) ................................. 2004-127278

(51) Int. Cl.
*G06F 15/16* (2006.01)

(52) U.S. Cl.
USPC ......................................................... 709/206

(58) Field of Classification Search
USPC ......................................................... 709/206
See application file for complete search history.

(56) References Cited

U.S. PATENT DOCUMENTS

| | | | |
|---|---|---|---|
| 2003/0046402 A1* | 3/2003 | Ooi | 709/228 |
| 2003/0107475 A1* | 6/2003 | Bautista et al. | 340/7.35 |
| 2004/0122565 A1* | 6/2004 | Sakurai et al. | 701/1 |

FOREIGN PATENT DOCUMENTS

| | | | |
|---|---|---|---|
| JP | A 6-243395 | | 9/1994 |
| JP | A 10-155040 | | 6/1998 |
| JP | A 11-275144 | | 10/1999 |
| JP | A 2002-78033 | * | 3/2002 |
| JP | A 2002-278903 | | 9/2002 |

* cited by examiner

*Primary Examiner* — Maceeh Anwari
(74) *Attorney, Agent, or Firm* — Oliff PLC

(57) ABSTRACT

A communication control module of a navigation apparatus determines that a short message that a communication module has received is from a mobile telephone that corresponds to identification data stored in advance in a RAM, and outputs a remote operation signal to a power source module. The navigation module acquires the IP address of the navigation apparatus when switched from a sleep mode to a wake-up mode, and after generating a mail that contains this acquired IP address, sends this mail to the mobile telephone that sent the activation data by using the mail address of this mobile telephone. Therefore, even when a new IP address is assigned to the navigation apparatus each time the navigation apparatus is activated, it is possible to remotely control the navigation apparatus easily from a remote site.

8 Claims, 8 Drawing Sheets

NAVIGATION SYSTEM AND NAVIGATION APPARATUS

TECHNICAL FIELD

The present invention relates to a navigation system and to a navigation apparatus.

BACKGROUND ART

A navigation apparatus simplifies the travel of a vehicle by displaying the route to a destination and by periodically displaying specific guidance. For this reason, the use of navigation apparatuses has been steadily increasing. In addition, a navigation system has been proposed in which the navigation apparatus is activated from an external terminal such as a personal computer or a telephone, and the destination is thereby set in the navigation apparatus (refer, for example, to Patent Document 1).

This navigation system can set the destination in a navigation apparatus that is mounted in a vehicle by using an external terminal before the driver enters the vehicle, and can quickly begin the route guidance after the driver enters the vehicle.

In the navigation system described above, however, in the case in which an external terminal remotely controls the navigation apparatus by activating the navigation apparatus mounted in the vehicle using Internet communication, it is necessary for the external terminal to acquire the IP address of the navigation apparatus. However, a control server newly assigns a different IP address each time the navigation apparatus is activated. Thus, it has not been possible for the external terminal to acquire the new IP address. As a result, remotely control of the destination setting and the like from an external terminal has been difficult.

[Patent Document 1] Japanese Patent Application No. JP-A-H6-243395

DISCLOSURE OF THE INVENTION

Problem to be Solved by the Invention

In consideration of the problem described above, an object of the present invention is to provide a navigation system and a navigation apparatus that enables carrying out remote control easily from a remote site even when a new IP address is assigned to the navigation apparatus each time the navigation apparatus is activated.

Means for Solving the Problem

In order to attain the object described above, the present invention provides a navigation system that includes a navigation apparatus and an external terminal that remotely controls this navigation apparatus. The navigation apparatus is provided with memory means that stores in advance a mail address of the external terminal, mail generating means, and wake-up means that receives activation data from the external terminal and switches the mail generating means from a sleep mode to a wake-up mode. The mail generating means acquires the IP address for the mail generating means itself when switched to the wake-up mode by the wake-up means. The mail generating means comprises mail generating means that generates a mail containing this acquired IP address, and sends this mail to the external terminal that sent the activation data by using the mail address of the external terminal.

According to the present invention, the wake-up means switches the mail generating means from the sleep mode to the wake-up mode when activation data from the external terminal is received. The mail generating means acquires the IP address of the navigation apparatus when it is switched to the wake-up mode. The mail generating means generates a mail that contains the IP address and then sends this mail by using the mail address of this external terminal to the external terminal that has sent the activation data. Therefore, this external terminal can connect to the navigation apparatus by using the IP address of the navigation apparatus, and can thereby remotely control the navigation apparatus. Specifically, the navigation system can remotely control the navigation apparatus easily from a remote site even if a new IP address is assigned to the navigation apparatus each time the navigation apparatus is activated.

When memory means serves as first memory means, the navigation apparatus may be provided with second memory means that stores in advance the fixed IP address of the navigation apparatus itself. The mail generating means may read and acquire the IP address stored in this second memory means.

In this case, the navigation apparatus stores in advance the fixed IP address of the navigation apparatus itself in the second memory means. The IP address is read and acquired by the mail generating means. Therefore, the external terminal can receive the fixed IP address of the navigation apparatus.

The mail generating means may acquire the assigned IP address from external control means that controls the navigation apparatus.

In this case, the mail generating means acquires the IP address from the external control means that controls the navigation apparatus. Therefore, when the external terminal activates the navigation apparatus, the external terminal is able to receive the new IP address, which has been assigned to the navigation apparatus by the external control means, as mail each time the navigation apparatus is activated.

The memory means may store in advance the identification data for the external terminal. The wake-up means may compare the identification data of the external terminal and the identification data included in the activation data and switch the mail generating means to the wake-up mode when both of the sets of the identification data match.

In this case, the wake-up means compares the identification data that is stored in advance in the memory means and the identification data that is included in the activation data and switches the mail generating means to the wake-up mode when both identification addresses match.

The mail generating means may encrypt the IP address and generate a mail that contains this encrypted IP address.

In this case, the IP address that is acquired by the navigation apparatus is encrypted by the mail generating means. Thus, it is possible to prevent another person (a third party) from remotely controlling the navigation apparatus by using the IP address.

The wake-up means may generate a signal directing that electric voltage be supplied to the mail generating means in order to wake-up the mail generating means when activation data from the external terminal has been received.

In this case, the wake-up means outputs a signal directing that electric voltage be supplied for wake-up to a power source apparatus that supplies a power source voltage to the navigation control apparatus. Thereby, the power source apparatus supplies a power source voltage for wake-up to the navigation control apparatus.

The external terminal may be provided with IP address acquiring means that acquires an IP address from a mail that has been generated by the mail generating means and connecting means that connects to the navigation apparatus based on the IP address that has been acquired by the IP address acquiring means.

In this case, the IP address acquiring means acquires the IP address that is contained in the mail that has been sent from the navigation apparatus. In addition, the connecting means connects to the navigation apparatus based on this acquired IP address. Therefore, the external terminal can use this acquired IP address to connect to the navigation apparatus and to remotely control the navigation apparatus.

The IP address acquiring means of the external terminal may acquire the IP address after decrypting an encrypted IP address.

In this case, the encrypted IP address that has been sent from the navigation apparatus is decrypted by the IP address acquiring means. Therefore, it is possible to prevent another person from remotely controlling the navigation apparatus by using the IP address.

The present invention further provides a navigation system that is provided with a navigation apparatus and an external terminal that remotely controls this navigation apparatus. The navigation apparatus is provided with memory means that stores in advance the mail address of the external terminal and mail generating means that, when activation data has been received from the external terminal, generates a mail that contains the IP address of the navigation apparatus itself and sends this mail to the external terminal that sent the activation data by using the mail address of the external terminal.

In this case, when the received data is activation data from an external terminal that has been stored in advance in the memory means, the mail generating means generates a mail that contains the IP address of the navigation apparatus, and sends this mail to the external terminal that has sent the activation data by using the mail address of this external terminal. Therefore, the external terminal can receive the IP address of the navigation apparatus as mail. As a result, the external terminal can connect to the navigation apparatus by using this IP address, and can remotely control the navigation apparatus.

When the memory means is first memory means, the navigation apparatus may be provided with second memory means that stores in advance the fixed IP address of the navigation apparatus itself. The mail generating means may read and acquire the IP address that has been stored in the second memory means.

In this case, the navigation apparatus stores in advance the fixed IP address of the navigation apparatus itself in the second memory means. The IP address is read and acquired by the mail generating means. Therefore, the external terminal can receive the fixed IP address of the navigation apparatus.

The mail generating means may acquire the assigned IP address from external control means that controls the navigation apparatus.

In this case, the mail generating means acquires the IP address from the external control means that controls the navigation apparatus. Therefore, the external terminal receives the IP address that has been newly assigned to the navigation apparatus from the external control means as mail each time the navigation apparatus is activated.

The present invention further provides a navigation apparatus that enables remote control by an external terminal. The navigation apparatus is provided with memory means that stores in advance the mail address of an external terminal, mail generating means, and wake-up means that receives activation data from the external terminal and switches the mail generating means from the sleep mode to the wake-up mode. The mail generating means acquires the IP address of the mail generating means itself when switched to the wake-up mode by the wake-up means. The mail generating means generates a mail that contains this acquired IP address and sends this mail to the external terminal that has sent the activation data by using the mail address of the external terminal.

In this case, the wake-up means switches the mail generating means from the sleep mode to the wake-up mode when the activation data from the external terminal is received. The mail generating means acquires the IP address of the navigation apparatus when the mail generating means has been switched to the wake-up mode, and after generating a mail that contains this acquired IP address, sends this mail to the external terminal that has sent the activation data by using the mail address of this external terminal. Therefore, the navigation apparatus enables remote control by the external terminal by using this IP address.

In the case in which the memory means is first memory means, the navigation apparatus may be provided with second memory means that stores in advance the fixed IP address of the navigation apparatus itself. The mail generating means may read and acquire the IP address that has been stored in this second memory means.

In this case, the navigation apparatus stores in advance the fixed IP address of the navigation apparatus itself in the second memory means. This IP address is read and acquired by the mail generating means. Therefore, it is possible for the external terminal to receive the fixed IP address of the navigation apparatus.

The mail generating means may acquire the assigned IP address from the external control means that controls the navigation apparatus.

In this case, the mail generating means acquires the IP address from the external terminal that controls the navigation apparatus. Therefore, when the external terminal activates the navigation apparatus, the external terminal receives the IP address newly assigned to the navigation apparatus from the external control means each time the navigation apparatus is activated.

The present invention further provides a navigation apparatus that enables remote control by an external terminal. The navigation apparatus is provided with memory means that stores in advance the mail address of the external terminal and mail generating means that, when the activation data from the external terminal has been received, generates a mail that contains its own IP address and sends this mail to the external terminal that has sent this activation data by using the mail address of the external terminal.

In this case, when the received data is activation data from an external terminal that has been stored in advance in the memory means, the mail generating means generates a mail containing the IP address of the navigation apparatus and sends this mail to the external terminal that sent this activation data by using the mail address of this external terminal. Therefore, the navigation apparatus enables remote control by the external terminal that uses this IP address.

The navigation apparatus may be provided with second memory means that stores in advance the fixed IP address of the navigation apparatus itself. The navigation apparatus may read and acquire the IP address that is stored in this second memory means.

In this case, the navigation apparatus stores in advance the fixed IP address of the navigation apparatus itself in the second memory means. The IP address is read and acquired by the mail generating means. Therefore, it is possible for the external terminal to receive the fixed IP address of the navigation apparatus.

The mail generating means may acquire the assigned IP address from the external control means that controls the navigation apparatus.

In this case, the mail generating means acquires the IP address from the external control means that controls the navigation apparatus. Therefore, the external terminal can receive the IP address that is newly assigned to the navigation apparatus from the external control means by mail each time the navigation apparatus is activated.

BRIEF DESCRIPTION OF THE DRAWINGS

FIG. 1 is a diagram of the system configuration of the navigation system for explaining a first embodiment of the present invention.
FIG. 2 is a block diagram showing the electronic configuration of the navigation system in FIG. 1.
FIG. 3 is a flowchart for explaining the operation of the communication control module in FIG. 2.
FIG. 4 is a flowchart for explaining the operation of the navigation application module in FIG. 2.
FIG. 5 is a flowchart for explaining the operation of the remote control application module for the mobile telephone in FIG. 2.
FIG. 6 is a block diagram showing the electronic configuration of a navigation system for explaining a second embodiment of the present invention.
FIG. 7 is a flowchart for explaining the operation of the navigation application module in FIG. 6.
FIG. 8 is a flowchart for explaining the operation of the remote control application module for the mobile telephone in FIG. 6.

BEST MODES FOR CARRYING OUT THE INVENTION

Figure 1:
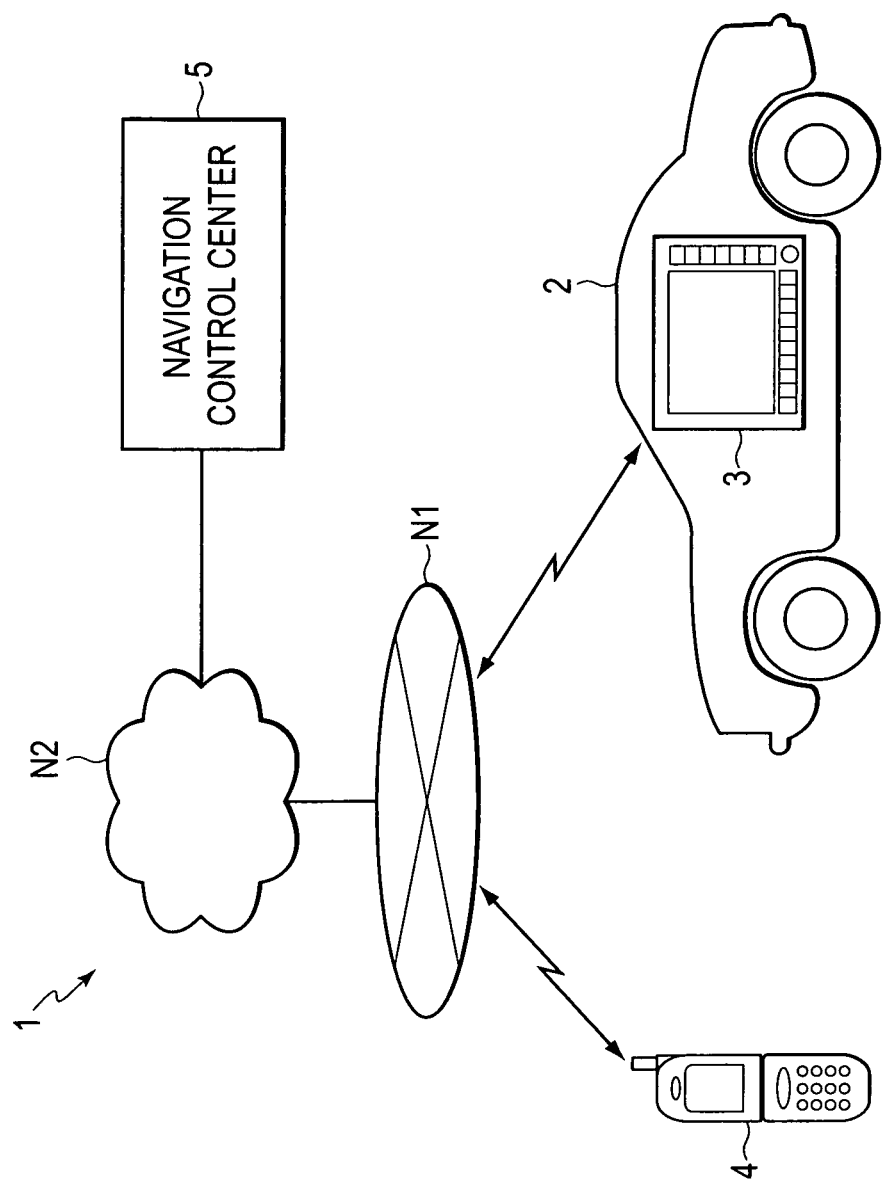
[FIG. 1]
Figure 2:
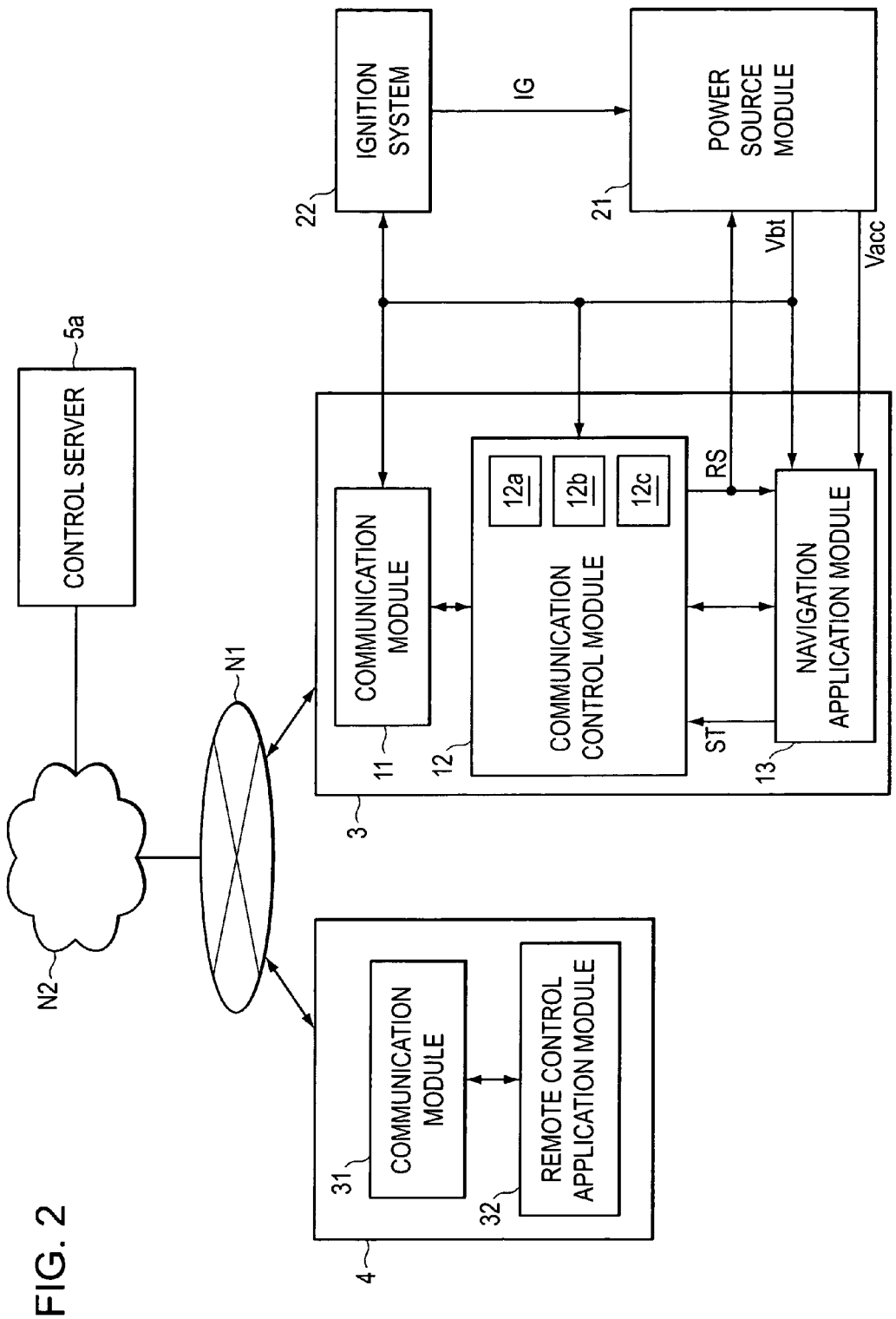
[FIG. 2]

Below, a first embodiment of the navigation system of the present invention will be explained with reference to the figures. FIG. 1 shows a diagram of the system configuration of the navigation apparatus. FIG. 2 shows the electronic configuration of the navigation system used in an automobile.

In FIG. 1, the navigation system 1 has a navigation apparatus (below, referred to as a "navigation apparatus") 3 that is mounted in an automobile 2, a mobile telephone 4 that serves as an external terminal, and a navigation control center (below, referred to as a "control center") 5. The navigation apparatus 3 can carry out telephony and messaging using a short message service (below, referred to as a "short message") via a mobile telephone network N1, which serves as a telephone network, with the mobile telephone 4. In addition, the navigation apparatus 3 can carry out mailing and sending and receiving of various types of information data with the mobile telephone 4 via the mobile telephone network N1 and the Internet N2. Furthermore, the navigation apparatus 3 can carry out the sending and receiving of various types of information data with the control center 5 via a mobile telephone network N1 and the Internet N2.

In FIG. 2, the navigation apparatus 3 is provided with a communication module 11, a communication control module 12 that forms wake-up means, and a navigation application module (below, referred to as a "navigation module") 13 that forms mail generating means. The communication module 11 is a mobile communication mechanism that has a mobile telephone function, and it carries out data communication with the mobile telephone 4 and the control center 5 via the mobile telephone network N1. The communication control module 12 is provided with a CPU 12a, a ROM 12b, and a RAM 12c that serves as memory means (first memory means). The communication control module 12 (CPU 12a) analyzes and recognizes communication data that the communication module 11 has received in accordance with a program that is stored in the ROM 12b. In addition, the telephone numbers and mail addresses for the mobile telephone 4 are stored in advance in the RAM 12c of the communication control module 12.

The communication control module 12 (CPU 12a) outputs a remote control signal RS to the power source module 21 mounted in the automobile 2 when the communication data received via the communication module 11 is a short message serving as activation data that is sent from the mobile telephone 4 that corresponds to the telephone number stored in advance in the RAM 12c as identification data. Note that because it is sufficient to recognize whether the received communication data matches the communication from the mobile telephone 4 that has been registered (stored) in advance, the short message serving as this activation data may be a short message having any content or may be what is called a blank message. In addition, in the present embodiment, the identification data is a telephone number. However, in addition to a telephone number, any data that can identify the mobile telephone 4 may be used.

In addition, when a navigation operation signal ST is input from the navigation module 13, the communication control unit 12 (CPU 12a) determines that the navigation module 13 has switched from the sleep mode to the wake-up mode, and switches to the "navigation operating mode". After switching to the "navigation operating mode", the communication control module 12 supplies the communication data that the communication module 11 has received via the mobile telephone network N1 to the navigation module 13. In addition, after switching to "navigation operating mode", the communication control module 12 outputs communication data that the navigation module 13 has generated to the communication module 11, and this communication data is sent from the communication module 11 to the mobile telephone network N1.

Furthermore, the communication control module 12 inputs the battery voltage Vbt of the power source module 21, and at these times detects the state of the battery voltage Vbt.

The power source module 21 is a power supply circuit that supplies a battery voltage Vbt or an accessory voltage Vacc to the navigation apparatus 3. For example, an accessory voltage Vacc is supplied to the navigation module 13 of the navigation apparatus 3 in response to an ignition signal IG from an ignition system 22 based on a key operation performed by the driver. In addition, the power source module 21 supplies an accessory voltage Vacc to the navigation module 13 in response to a remote control signal RS from the communication control module 12.

The navigation module 13 switches from the sleep mode to the wake-up mode when the accessory voltage Vacc from the power source module 21 is applied, and switches from the wake-up mode to the sleep mode when the accessory voltage Vacc is no longer applied.

The navigation module 13 is provided with an input apparatus, a current position detecting apparatus, a memory apparatus, a central processing unit (CPU), and an image display apparatus. In addition, in order for the navigation module 13 to execute the setting of the destination, map displays, address searches, telephone searches, route searches, route guidance to the destination and the like by using these apparatuses, the central processing unit (CPU) executes well-known processing operations depending on programs that have been stored in the memory apparatus. In addition, based on a remote control program stored in the memory apparatus, the navigation module 13 executes the setting of the destination, the map displays, address searches, telephone searches and the like in response to communication data that the communication module 11 has received.

Furthermore, when the navigation module 13 switches from the sleep mode to the wake-up mode, the navigation module 13 is connected to the control center 5 via a mobile telephone network N1 and the Internet N2 based on the remote control program, and the IP address of the navigation apparatus 3 is acquired from the control server 5a of the control center 5. The control server 5a functions as external control means. Furthermore, when the navigation module 13 acquires the IP address based on the remote control program, the navigation module 13 encrypts this IP address. The navigation module 13 generates a mail that contains the encrypted IP address, and sends the mail to the mobile telephone 4 that sent the short message via the communication control module 12 and the communication module 11.

Next, the electronic configuration of the mobile telephone 4 will be explained. The mobile telephone 4 is provided with a communication module 31 and a remote control application module (below, referred to as a "remote control module") 32, which serves as IP address acquiring means and connecting means. The communication module 31 carries out data communication via the navigation apparatus 3, the control center 5, and the mobile telephone network N1. When the communication module 31 receives communication data (a mail containing an encrypted IP address) sent via the Internet N2 and the mobile telephone network N1, the communication module 31 outputs this received communication data to the remote control module 32.

The remote control module 32 is provided with a CPU, ROM, and RAM, and this CPU decrypts the encrypted IP address based on a remote control program that has been stored in the ROM. When the remote control module 32 has encrypted the IP address, the remote control module 32 establishes a session with the navigation apparatus 3 by using the IP address, without connecting to the control server 5a of the control center 5, depending on the mobile telephone 4 being operated by the driver (operator). Then, due to the driver operating buttons on the mobile telephone 4 while viewing the display screen of the mobile telephone 4, the setting of the destination, the map displays, the address searches, telephone searches and the like are executed in the navigation apparatus 3. The remote control module 32 thereby generates various types of data and sends this data to the navigation apparatus 3 from the communication module 31.

Next, the operation of the navigation system 1 structured as described above will be explained with reference to the flowcharts shown in FIG. 3 to FIG. 5.

Figure 3:
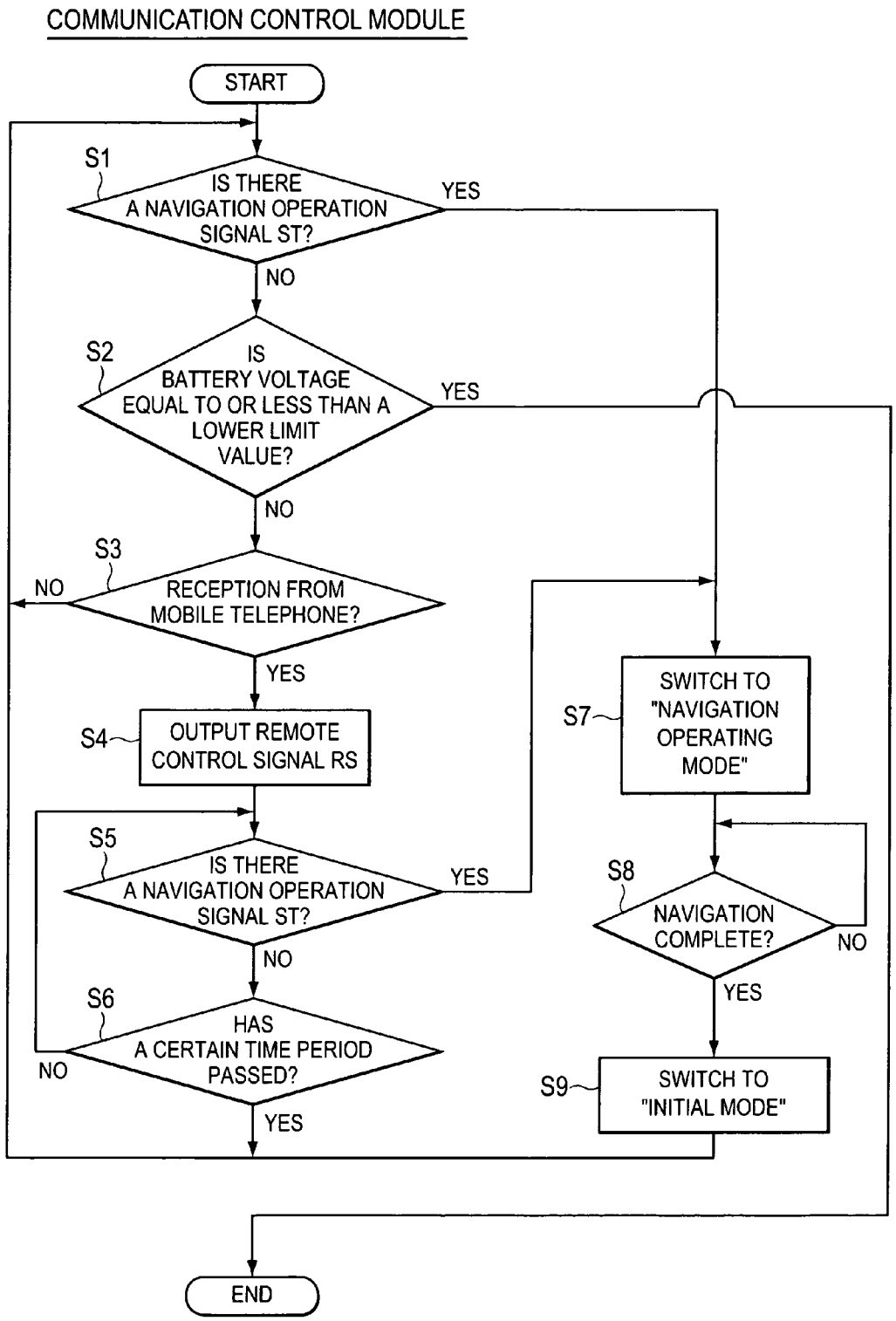
[FIG. 3]
Figure 4:
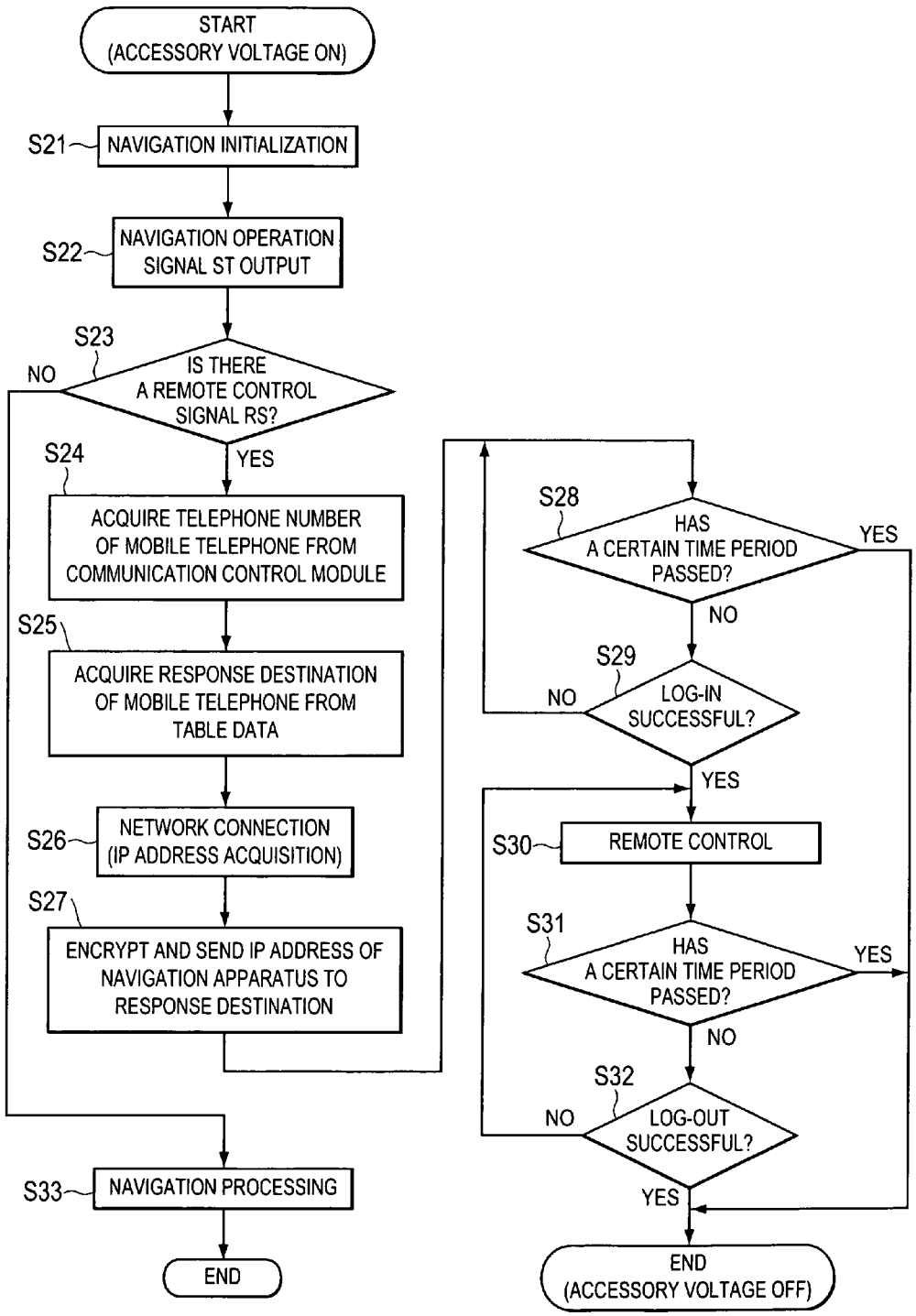
[FIG. 4]
Figure 5:
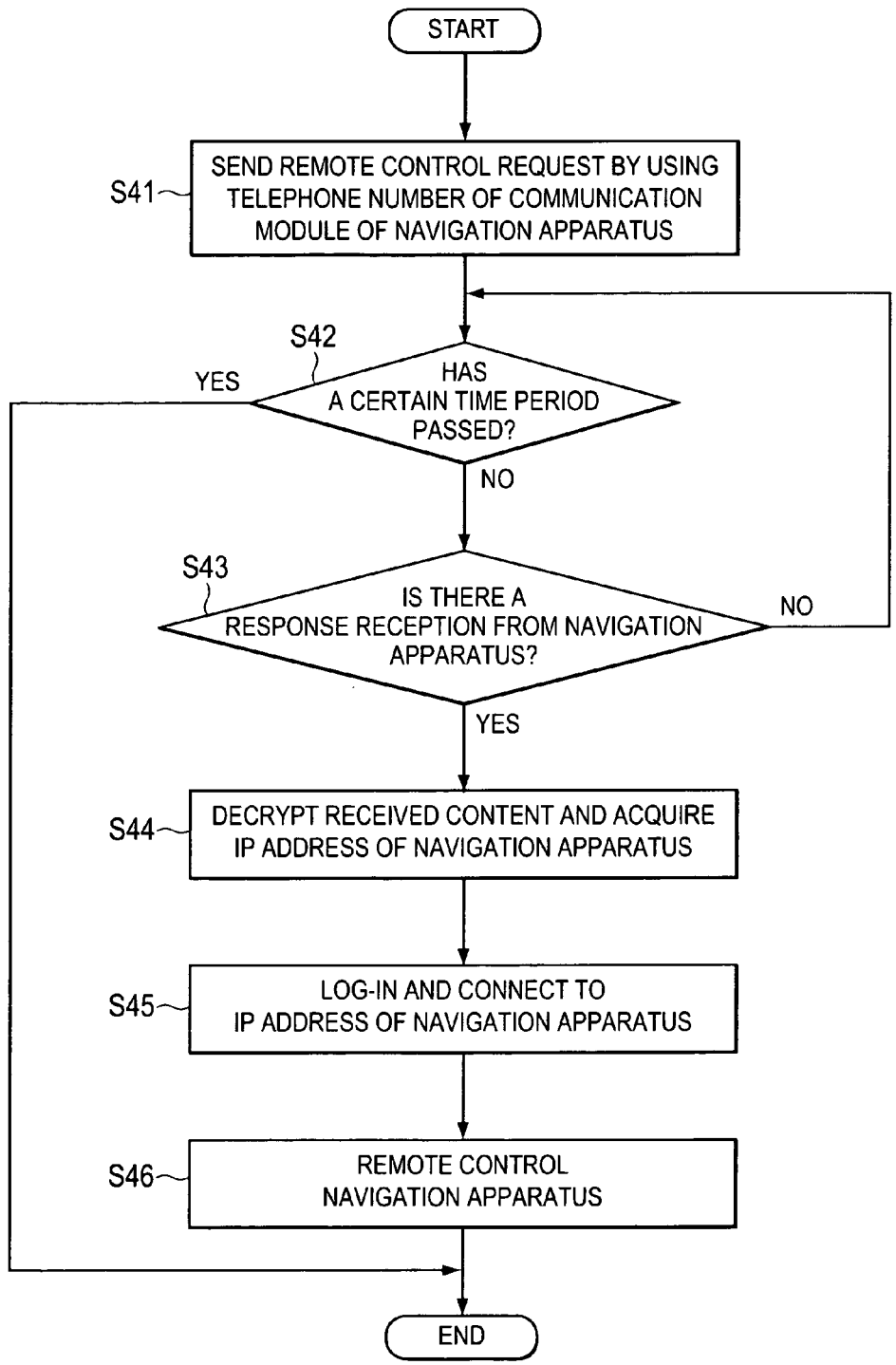
[FIG. 5]

FIG. 3 is a flowchart showing the operation of the communication control module 12 of the navigation apparatus 3, FIG. 4 is a flowchart showing the operation of the navigation module 13 of the navigation apparatus 3, and FIG. 5 is a flowchart showing the operation of the remote control module 32 of the mobile telephone 4.

Assume that the automobile 2 is, for example, parked in a parking lot. In this state, in the automobile 2, the key has been removed and the engine is stopped, and the power source module 21 is supplying a back-up voltage (the battery voltage Vbt) to the navigation apparatus 3. Therefore, the navigation apparatus 3 is not activated. That is, the navigation module 13 is in a sleep mode.

In contrast, the communication module 11 and the communication control module 12 of the navigation apparatus 3 are in the stand-by mode, waiting to receive a short message from the mobile telephone 4.

This will now be described in more detail. In FIG. 3, the communication control module 12 (CPU 12a) stands-by while respectively checking whether a navigation operating signal ST has been output from the navigation module 13 (step S1), whether the battery voltage Vbt is equal to or less than a lower limit value that has been determined in advance (step S2), and whether a short message from the mobile telephone 4 has been received (step S3). At this point in time, because the navigation module 13 is in the sleep mode, the navigation operation signal ST is not output. Note that in step S2, when the battery voltage Vbt is equal to or less than a lower limit value determined in advance, the communication control module 12 stops the processing operations for the remote control by the mobile telephone 4.

While the communication control module 12 (CPU 12a) is in stand-by mode (steps S1 to S3), the mobile telephone 4 sends a short message to the navigation apparatus 3 when the driver, who wishes to remotely control the navigation apparatus 3 by using the mobile telephone 4, operates the mobile telephone 4. The short message sent from the communication module 31 of the mobile telephone 4 is received by the communication module 11 of the navigation apparatus 3 via the mobile telephone network N1. The communication module 11 outputs the short message to the communication control module 12 (CPU 12a) as communication data.

The communication control module 12 determines whether or not the mobile telephone 4 that sent this short message is the mobile telephone 4 that has been registered in advance (step S3). The communication control module 12 compares the telephone number appended to the short message and the telephone number stored in the RAM 12c of the communication control module 12. Then, when the telephone number appended to the short message matches the telephone number of the mobile telephone 4 that has been registered in advance (YES in step S3), the communication control module 12 outputs a remote control signal RS to the power source module 21 (step S4). When the remote control signal RS is output, the communication control module 12 waits for a certain predetermined time period for the output of the navigation operating signal ST from the navigation module 13 (steps S5 and S6). Then when the navigation operating signal ST has not been output after the certain predetermined time period has passed (YES in step S6), the communication control module 12 returns to step S1 and waits for a new short message from the mobile telephone 4.

When the communication control module 12 outputs the remote control signal RS, the power source module 21 applies an accessory voltage Vacc to the navigation module 13 in response thereto. When the accessory voltage Vacc is applied, the navigation module 13 switches from the sleep mode to the wake-up mode, and as shown in FIG. 4, initialization processing is carried out (step S21). Next, the navigation module 13 outputs a navigation operating signal ST to the communication control module 12 (step S22).

Therefore, the communication control module 12 determines that the navigation module 13 is able to operate (remotely control) in response to the navigation operating signal ST (YES in step S5), and switches to the navigation operating mode (step S7). After switching to the navigation operating mode, the communication control module 12 can send various types of data generated by the navigation module 13 via the communication module 11 in order to carry out remote control by the mobile telephone 4. In addition, the communication control module 12 can output to the navigation module 13 various types of data that have been received by the communication module 11 in order to carry out remote control by the mobile telephone 4.

In addition, the communication control module 12 remains in the navigation operating mode until the remote control by the mobile telephone 4 has been completed (step S8). Then, when the remote control by the mobile telephone 4 has been completed (YES in step S8), after the communication control module 12 has switched from the navigation operating mode to an initial mode (step S9), the processing returns to step S1 and waits for a new short message from the mobile telephone 4.

In contrast, when a navigation operating signal ST is output in step S22, the navigation module 13 checks whether there has been a remote control signal RS (step S23). Specifically, the navigation module 13 checks whether this wake-up mode is due to a short message from the mobile telephone 4 or is due to an ignition signal IG from the ignition system 22 caused by the occurrence of a key operation. In this case, because the wake-up mode of the navigation module 13 is due to a short message from the mobile telephone 4 (YES in step S23), the navigation module 13 acquires the telephone number of the mobile telephone 4 that has sent the short message from the short message from the communication control module 12 (step S24). Next, the navigation module 13 acquires the mail address of the mobile telephone 4 that has sent the short message from the communication control module 12 (RAM 12c) (step S25).

Next, the navigation module 13 connects to the control server 5a of the control center 5 on the Internet N2 and acquires the IP address of the navigation apparatus 3 from the control server 5a (step S26). The navigation module 13 encrypts the acquired IP address, generates, for example, a URL-formatted mail that contains the encrypted IP address, and sends the mail to the mobile telephone 4 corresponding to the acquired mail address (step S 27). The navigation module 13 then stands-by for a certain predetermined time period until logging in to the mobile telephone 4 that has sent the short message (steps S28 and S29).

Then, after logging-in within a certain time period to the mobile telephone 4, the navigation module 13 receives various types of data sent from the mobile telephone 4 in order to execute the setting of the destination, the map displays, the address searches, the telephone searches and the like in the navigation apparatus 3, and carries out remote control (step S30). Specifically, for example, in the case of remote control for setting the destination, the destination setting start data that indicates the destination setting, data about the destination (destination data) and the like are sent from the mobile telephone 4 to the navigation module 13. Based on this variety of data, the navigation module 13 stores the destination data in a memory apparatus.

Then, after one remote process has been completed, the navigation module 13 completes the remote control when logging-out within a certain time period (NO in step S31, YES in step S32), or when a certain time period has passed (YES in step S31). At this time, the navigation module 13 outputs a signal that stops the application of the accessory voltage Vacc to the power source module 21, which indicates that the processing operation for the remote control of the navigation apparatus 3 has been completed. Thus, the navigation module 13 switches again to the sleep mode.

Then, when the driver who has set the destination by using the mobile telephone 4 enters the automobile 2 and operates the key, the ignition signal IG is output from the ignition system 22, and the accessory voltage Vacc from the power source module 21 is applied to the navigation module 13. After steps S21 and S22 described above have been executed, the navigation module 13 checks whether this wake-up mode is due to a short message from a mobile telephone 4 or due to a key operation (step S23).

In this case, the wake-up mode of the navigation module 13 is due to a key operation (NO in step S23), and thus the navigation module 13 executes the normal navigation processing (step S33). Because the destination has already been set before the driver enters the vehicle, the navigation module 13 immediately executes the route search corresponding to the destination that has been set beforehand simply by the driver carrying out the operation of starting the route guidance to the destination in the input apparatus of the navigation apparatus 3, and the route guidance display thereby starts. Therefore, because the labor for setting the destination after entering the automobile 3 has been eliminated, the driver can travel immediately toward the destination.

Next, the operation of the mobile telephone 4 that remotely controls the navigation apparatus 3 will be explained with reference to the flowchart in FIG. 5, which shows the operation of the remote control module 32.

Here, the remote control module 32, which remotely controls the navigation apparatus 3 by using the mobile telephone 4, uses the telephone number of the communication module 11 of the navigation apparatus 3 to send a short message to the navigation apparatus 3 (step S41). The remote control module 32 then waits for the reception of a URL-formatted mail from the navigation apparatus 3 that contains the encrypted address of the navigation apparatus 3 (steps S42 and S43).

Specifically, based on the short message sent from the communication module 31 of the mobile telephone 4, the communication control module 12 and the navigation module 13 execute the processing operations described above. Then, when the navigation module 13 sends the URL-formatted mail that contains the IP address that was encrypted in step S27, the mobile telephone 4 (the remote control module 32) receives the mail (YES in step S 43). Next, the remote control module 32 decrypts the encrypted IP address and thereby acquires the IP address of the navigation apparatus 3 (step S44).

When the remote control module 32 acquires the IP address of the navigation apparatus 3, depending on the driver operating the buttons of the mobile telephone 4, the remote control module 32 logs-in and connects to the navigation module 13 by using the acquired IP address (step S45). In addition, after logging-in, depending on the driver operating the buttons of the mobile telephone 4, the remote control module 32 sends data for remotely controlling the navigation apparatus 3 (step S46). Specifically, by the driver operating the buttons of the mobile telephone 4, it is possible for the navigation apparatus 3 to execute the setting of the destination, address searches, telephone number searches, and illuminating the map display light.

Next, the effects of the navigation system 1 structured as described above will be explained below.

(1) According to the present embodiment, it is possible to activate the navigation apparatus 3 by using the mobile telephone 4. In addition, the navigation apparatus 3 sends a newly assigned IP address to the mobile telephone 4 by mail each time this navigation apparatus 3 is activated. Therefore, even if this IP address changes each time the navigation apparatus 3 is activated, the mobile telephone 4 can acquire this changed IP address via the mail from the navigation apparatus 3, and can connect to the navigation apparatus 3 by using this acquired IP address. The mobile telephone 4 can thereby remotely control the navigation apparatus 3 by the buttons of the mobile telephone 4 being operated. The driver can set the destination before entering the automobile 2 by using, for example, the mobile telephone 4. This means that the driver can immediately depart, rather than depart after setting the destination after entering the vehicle.

(2) According to the present embodiment, the navigation apparatus 3 encrypts and sends the IP address. The mobile telephone 4 decrypts this encrypted IP address, and acquires thereby the IP address of the navigation apparatus 3. Therefore, it is possible to prevent a mobile telephone of another person (a third party) from mistakenly acquiring the IP address, and prevent the third party thereby remotely controlling the navigation apparatus 3 by using this IP address.

(3) According to the present embodiment, when a short message has been received from a mobile telephone 4 that corresponds to a telephone number that has been registered in advance in the navigation apparatus 3, the navigation apparatus 3 switches from a sleep mode to a wake-up mode. Therefore, even if a short message is sent to the navigation apparatus 3 from a mobile telephone that has not been registered in advance, the navigation apparatus 3 is not activated.

Next, a second embodiment of the navigation system of the present invention will be explained with reference to the drawings. In the present embodiment, the navigation apparatus mounted in the automobile 2 differs from the first embodiment in the point that the navigation apparatus that is mounted in the automobile 2 stores a fixed IP address of the navigation apparatus itself, and an IP address is not assigned by the navigation control center 5 on each occasion, as is the case with the first embodiment. Therefore, for the convenience of explanation, the points of difference between the embodiments will be explained in detail; structures that are similar to that of the first embodiment will be denoted by identical reference numerals, and detailed explanation thereof will be omitted.

Figure 6:
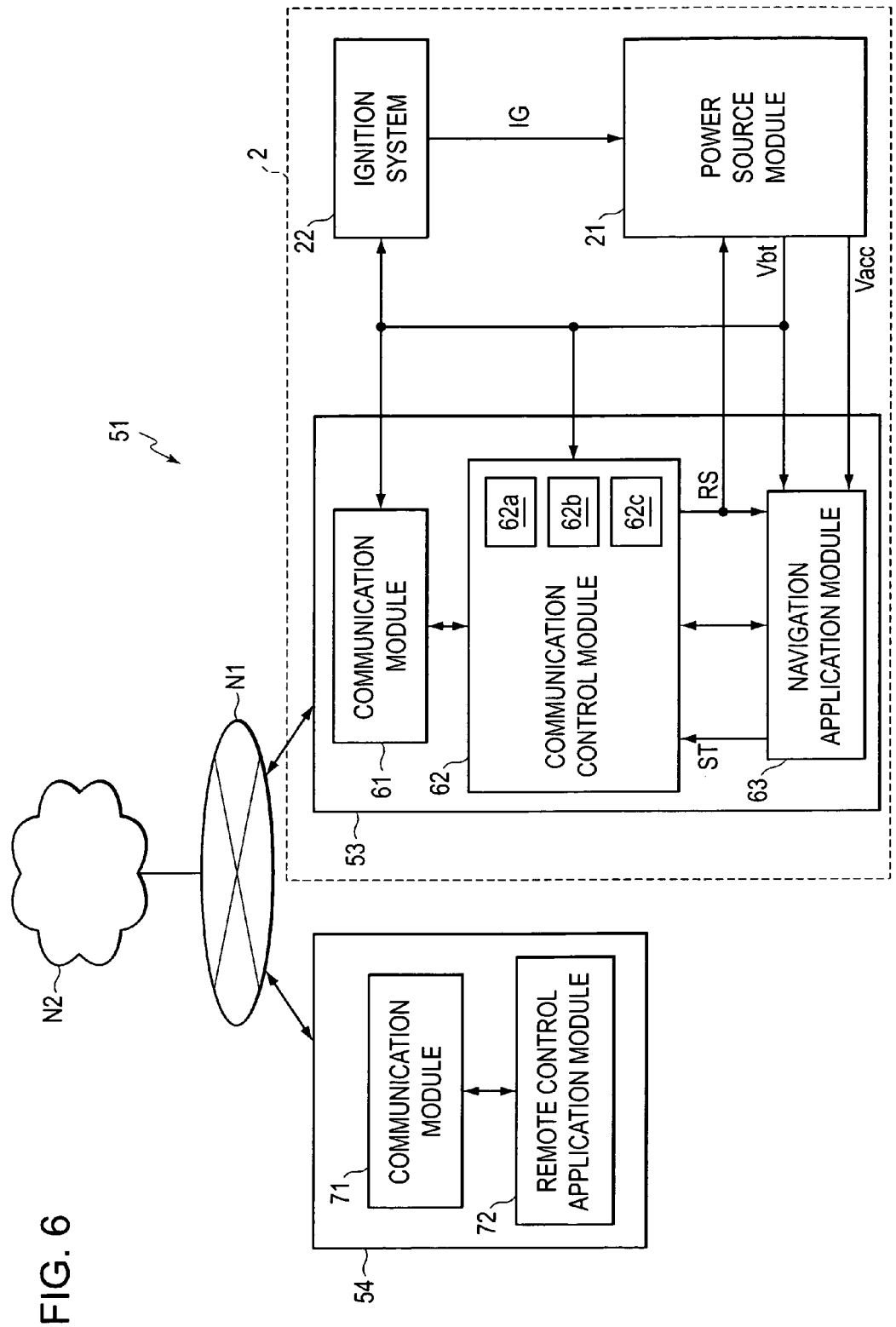
[FIG. 6]

In FIG. 6, the navigation system 51 has a navigation apparatus (below, referred to as the "navigation apparatus") 53 mounted in an automobile 2 and a mobile telephone 54 that serves as an external terminal. The navigation apparatus 53 can carry out telephony and short messaging with the mobile telephone 54 via a mobile telephone network N1. In addition, the navigation apparatus 53 can carry out mailing and the sending and receiving of various types of information data with the mobile telephone 54 via the mobile telephone network N1 and the Internet N2. The navigation apparatus 53 is provided with a communication module 61, a communication control module 62 that forms wake-up means, and a navigation application module (below, referred to as a "navigation module") 63 that forms mail generating means.

The communication module 61 is a mobile communication apparatus that has a mobile telephone function, and it carries out data communication with the mobile telephone 54 via the mobile telephone network N1. The communication control module 62 is provided with a CPU 62a, a ROM 62b, and a RAM 62c that serves as memory means (first memory means) and second memory means. The communication control module 62 (CPU 62a) analyzes and recognizes communication data that the communication module 61 has received depending on a program that has been stored in the ROM 62b. In addition, the telephone number and mail address of the mobile telephone 54 are stored in advance in the RAM 62c of the communication control module 62. Furthermore, the fixed IP address of the navigation apparatus 53 itself is stored in advance in the RAM 62c of the communication control module 62.

The communication control module 62 (CPU 62a) outputs a remote control signal RS to the power source module 21 that is mounted in the automobile 2 when the communication data received via the communication module 61 is a short message that has been sent from the mobile telephone 54 corresponding to a telephone number stored in the RAM 62c as identification data in advance and that serves as activation data. Note that because it is sufficient to recognize whether the received communication data matches the communication from the mobile telephone 54 that has been registered (stored) in advance, similarly to the first embodiment, the short message serving as this activation data may be a short message having any content or what is called a blank message. In addition, in the present embodiment, similarly to the first embodiment, the identification data is a telephone number, but in addition to a telephone number, any data that can identify the mobile telephone 54 may be used.

In addition, when a navigation operating signal ST is input from the navigation module 63, the communication control module 62 (CPU 62a) determines that the navigation module 63 has switched from the sleep mode to the wake-up mode, and switches to "navigation operating mode". After switching to the "navigation operating mode", the communication control module 62 supplies the communication data that the communication module 61 has received to the navigation module 63 via the mobile telephone network N1. In addition, after switching to the "navigation operating mode", the communication control module 62 outputs communication data that the navigation module 63 has generated to the communication module 61 and then sends the communication data from the communication module 61 to the mobile telephone network N1.

Furthermore, the battery voltage Vbt of the power source module 21 is input into the communication control module 62, and the communication control module 62 detects the state of the battery voltage Vbt at this time.

The navigation module 63 switches from the sleep mode to the wake-up mode when an accessory voltage Vacc is applied from the power source module 21 based on a key operation or a remote control signal RS, and switches from the wake-up mode to the sleep mode when the accessory voltage Vacc is no longer applied.

The navigation module 63 is provided with an input apparatus, a current position detecting apparatus, a memory apparatus, a central processing unit (CPU), and an image display apparatus. In addition, in order for the navigation module 63 to execute the setting of the destination, the map displays, the address searches, the telephone searches, the route searches, the route guidance to the destination, and the like by using these apparatuses, the central processing unit (CPU) executes well-known processing operations depending on programs stored in the memory apparatus. In addition, the navigation module 63 executes the setting of the destination, the map displays, the address searches, the telephone searches and the like depending on the communication data that the communication module 61 has received based on remote control programs stored in the memory apparatus.

Furthermore, after switching from the sleep mode to the wake-up mode, the navigation module 63 reads the fixed IP address of the navigation apparatus 53 itself from the RAM 62c of the communication control module 62 based on the remote control program. When the navigation module 63 reads the fixed IP address, the navigation module 63 encrypts this IP address, generates a mail that contains the encrypted IP address, and sends the mail to the mobile telephone 54 that sent the short message mail via the communication control module 62 and the communication module 61.

Next, the electronic configuration of the mobile telephone 54 will be explained. The mobile telephone 54 is provided with a communication module 71 and a remote control application module (below, referred to as a "remote control module") 72 that serves as IP acquiring means and connecting means. The communication module 71 carries out data communication (sending short messages) via the navigation apparatus 53 and the mobile telephone network N1. In addition, when the communication module 71 receives the communication data (a mail that contains the encrypted IP address) sent from the navigation apparatus 53 via the Internet N2 and the mobile telephone network N1, this received communication data is output to the remote control module 72.

The remote control module 72 is provided with a CPU 72a, a ROM 72b, and a RAM 72c, and this CPU 72a decrypts the encrypted IP address based on a remote control program that has been stored in the ROM 72b. When the remote control module 72 (CPU 72a) has decrypted the IP address, the remote control module 72 stores the IP address in the RAM 72c, and at the same time, establishes a session with the navigation apparatus 53 by using the IP address depending on the operation of the mobile telephone 54 by the driver. Then, in order to execute the setting of the destination, the map displays, the address searches, the telephone searches and the like in the navigation apparatus 53 that are due to the driver operating buttons on the mobile telephone 54 while viewing the display screen of the mobile telephone 54, the remote control module 72 generates each type of data and sends the data from the communication module 71 to the navigation apparatus 53.

Next, the operation of the navigation system 51 that is structured as described above will be explained with reference to FIG. 7 and FIG. 8.

Note that in the present embodiment, the communication control module 62 of the navigation apparatus 53 carries out an operation that is similar to that in the flowchart shown in FIG. 3 for the communication control module 12 explained in the first embodiment. Therefore, here, the operation of the navigation module 63 and the mobile telephone 54 will be explained.

Figure 7:
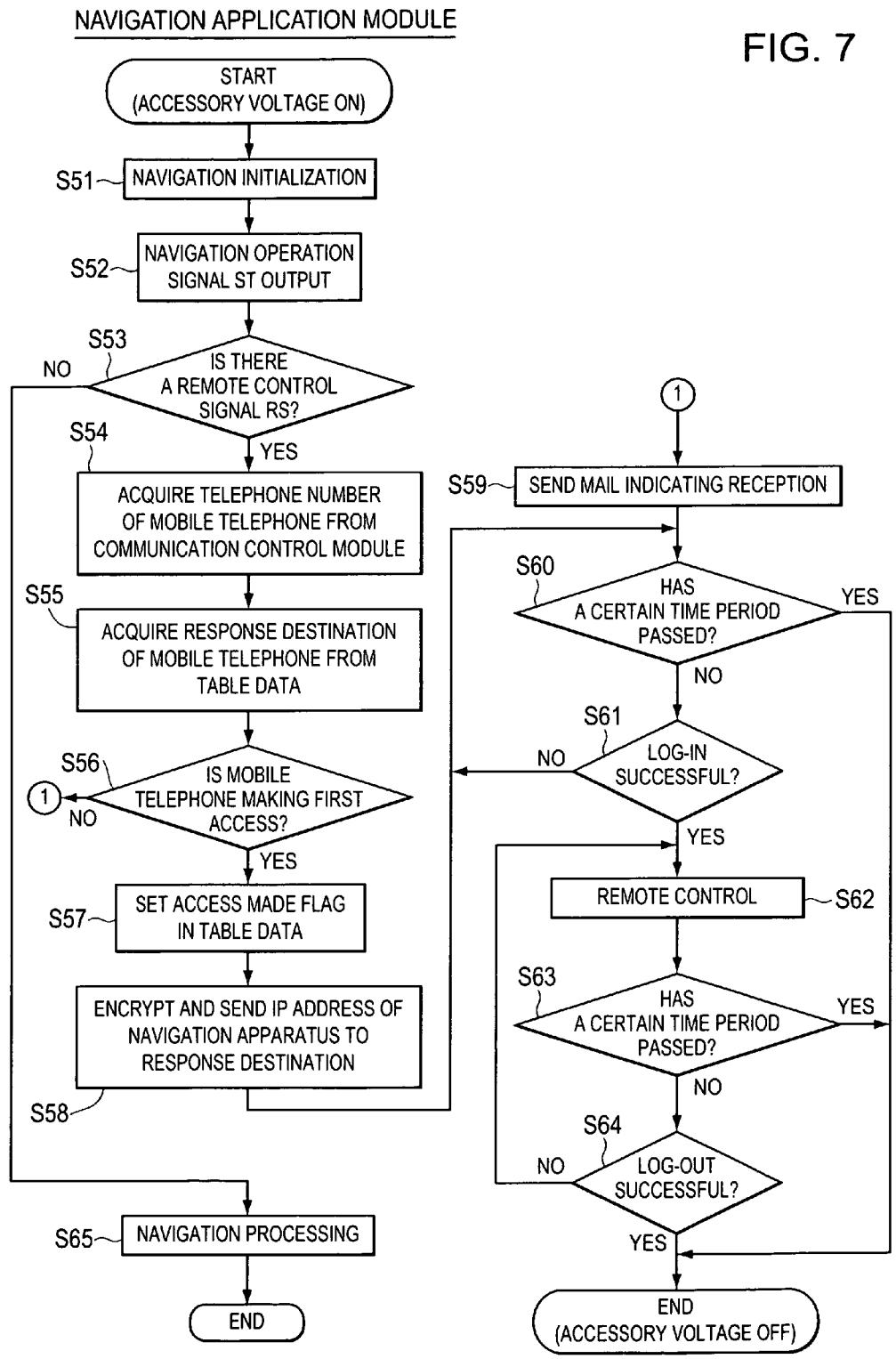
[FIG. 7]
Figure 8:
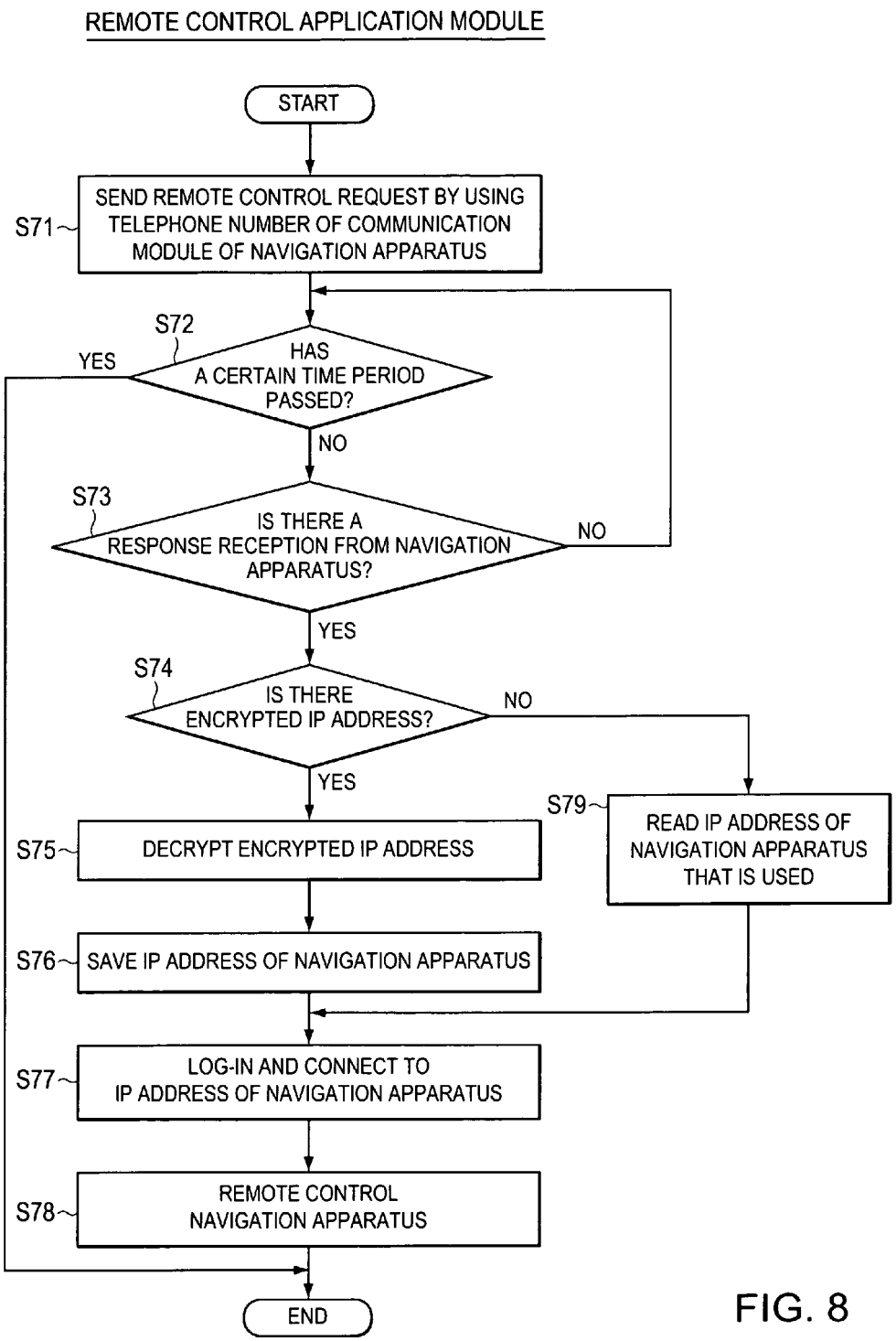
[FIG. 8]

FIG. 7 is a flowchart showing the operation of the navigation module 63 of the navigation apparatus 53, and FIG. 8 is a flowchart showing the operation of the remote control module 72 of the mobile telephone 54.

Here, when the communication control module 62 outputs a remote control signal RS (refer to step S4 in FIG. 3), in response thereto, the power source module 21 applies an accessory voltage Vacc to the navigation module 63. When the accessory voltage Vacc has been applied, the navigation module 63 switches from the sleep mode to the wake-up mode, and as shown in FIG. 7, initialization processing is carried out (step S51). Next, the navigation module 63 outputs the navigation operation signal ST to the communication control module 62 (step S52).

The navigation module 63 checks whether or not the remote control signal RS has been input from the communication control module 62 (step S53). Specifically, similarly to the first embodiment, the navigation module 63 checks whether this wake-up mode is due to a short message from the mobile telephone 54 or is due to an ignition signal IG from the ignition system 22 because of a key operation. In this case, the wake-up mode of the navigation module 63 is due to a short message from the mobile telephone 54 (YES in step S53), and thus the navigation module 63 acquires the telephone number of the mobile telephone 54 that sent the short message by using the short message from the communication control module 62 (step S54). Next, the navigation module 63 reads and acquires the mail address of the mobile telephone 54 that sent the short message from the communication control module 62 (RAM 62c) (step S55).

Next, the navigation module 63 checks whether or not the access for a request (remote control) for the IP address that has been made by the mobile telephone 54 is the first one (step S56). At this time, the navigation module 63 reads the history data of the mobile telephone 54 that is stored in the RAM 62c of the communication control module 62 based on the acquired telephone number of the mobile telephone 54. The history data is information concerning whether or not an access has occurred in order to remotely control the navigation apparatus 53 by the mobile telephone 54, and the presence or absence of an access is determined by the presence or absence of a flag for the mobile telephone 54.

In addition, when the navigation module 63 has determined that, because there is no flag, up to the present there has been no access made in order to carry out remote control by the mobile telephone 54 (YES in step S56), the history data for this mobile telephone 54 is written into the RAM 62c of the communication control module 62. That is, navigation module 62 sets a flag (step S57). Next, the navigation module 63 proceeds to step S58.

In step S58, the navigation module 63 reads and acquires the fixed IP address of the navigation apparatus 53 from the RAM 62c of the communication control module 62, and encrypts this acquired IP address. Then, the navigation module 63 generates, for example, a URL-formatted mail that contains the encrypted IP address, and sends the mail to the mobile telephone 54 that corresponds to the acquired mail address.

In contrast, when the navigation module 63 determines that, because there is a flag, an access that has been made in order to request an IP address by the mobile telephone 54 (NO in step S56) has already occurred, the fixed IP address of the navigation apparatus 53 is not encrypted and sent, but rather the mail is sent to the mobile telephone 54 indicating that a transmission for requesting remote control has been sent (step S59).

The navigation module 63 stands-by for a certain predetermined time period until logging-in with the mobile telephone 54 of the sending destination of the short message (steps S60 and S61).

In addition, when the log-in with the mobile telephone 54 occurs within a certain time period (YES in step S61), the navigation module 63 receives various types of data sent from the mobile telephone 54 in order to execute the setting of the destination, the map displays, the address searches, the telephone searches, and the like to the navigation apparatus 53, and executes remote control (step S62). Specifically, for example, in the case of remote control for setting the destination, the destination setting start data that indicates the destination setting and the data for the destination (destination data) are sent from the mobile telephone 54 to the navigation module 63. The navigation module 63 stores the destination data in a memory apparatus based on each type of information.

Then, after one remote process has been completed, when the navigation module 63 logs-out within a certain time period (NO in step S63, YES in S64), or when a certain time period has passed (YES in step S63), the remote control is completed. At this time, the navigation module 63 outputs a signal to the power source module 21 directing that the application of the accessory voltage Vacc be stopped, which indicates that the processing operation by remote control has been completed. Therefore, the navigation module 63 again switches to sleep mode.

In addition, when the driver who has set the destination by using the mobile telephone 54 enters the automobile 2 and operates the key, an ignition signal IG is output from the ignition system 22, and an accessory voltage Vacc is applied to the navigation module 63 from the power source module 21. After steps S51 and S52 have been executed, the navigation module 63 checks whether this wake-up mode is due to a short message from the mobile telephone 54 or due to operating the key (step S53).

In this case, the wake-up mode of the navigation module 63 is due to the operation of a key (NO in step S53), and thus the navigation module 63 executes the normal navigation processing (step S65). Because the destination is already set before the driver enters the vehicle, the navigation module 63 immediately executes the route search and starts the route guidance display based on the present position and the destination that has been set in advance simply by the driver carrying out the operation for starting the route guidance to the destination in the input apparatus of the navigation apparatus 53. Therefore, because the labor of setting the destination after entering the automobile 2 has been eliminated, the driver can immediately travel toward the destination.

Next, the operation of the mobile telephone 54 that remotely controls the navigation apparatus 53 will be explained with reference to the flowchart in FIG. 8, which shows the operation of the remote control module 72.

Here, the remote control module 72 (CPU 72a), which remotely controls the navigation apparatus 53 by using the mobile telephone 54, sends a short message to the navigation apparatus 53 by using the telephone number of the communication module 61 of the navigation apparatus 53 (step S71). Next, the remote control module 72 (CPU 72a) waits to receive a URL-formatted mail from the navigation apparatus 53 that contains the encrypted IP address of the navigation apparatus 53 (steps S72 and S73).

Specifically, based on a short message sent from the communication module 71 of the mobile telephone 54, the communication control module 62 and the navigation module 63 execute the process operations described above. In addition, within a certain time period, when the navigation module 63 sends either the URL-formatted mail that contains the IP address that was encrypted in step S58 or a simple response mail that was executed in step S59, the remote control module 72 (CPU 72a) determines whether or not the mail that contains the encrypted IP address has been received (steps S73 and S74).

In addition, in the case in which the mail received from the navigation module 63 contains the encrypted IP address (YES in step S74), the remote control module 72 (CPU 72a) decrypts the encrypted IP address, acquires thereby the fixed IP address of the navigation apparatus 53 (step S75), and stores this IP address in the RAM 72c of the remote control module 72 (step S76).

When the remote control module 72 (CPU 72a) has stored the fixed IP address of the navigation apparatus 53 in the RAM 72c of the remote control module 72, the remote control module 72 logs-in and connects to the navigation module 63 by using this IP address due to the driver operating the buttons of the mobile telephone 54 (step S77). In addition, after logging-in, the remote control module 72 sends data for remotely controlling the navigation apparatus 53 depending on the buttons of the mobile telephone 54 that have been operated by the driver (step S78). Specifically, due to the buttons of the mobile telephone 54 being operated by the driver, the navigation apparatus 53 can execute the setting of the destination, the address searches, the telephone number searches, and the illumination of the map display light.

In contrast, in the case in which the mail that has been received from the navigation module 63 does not contain an encrypted IP address (NO in step S74), the remote control module 72 (CPU 72a) reads the IP address from the RAM 72c of the remote control module 72, which indicates that the IP address of the navigation apparatus 53 has already been acquired during an access carried out previously (step S79). Due to the driver operating the buttons of a mobile telephone 54, the remote control module 72 (CPU 72a) logs-in and connects to the navigation module 63 by using this IP address (step S77).

Next, the effects of the navigation system 51 structured as described above will be explained below.

(1) According to on the present embodiment, it is possible to activate the navigation apparatus 53 by using the mobile telephone 54. When, in order to carry out remote control, the mobile telephone 54 first accesses and activates the navigation apparatus 53, the navigation apparatus 53 sends the fixed IP address of the navigation apparatus 53 to the mobile telephone 4 by mail. Therefore, the mobile telephone 54 can acquire the IP address of the navigation apparatus 53 via a mail from the navigation apparatus 53 by accessing the navigation apparatus 53 and activating the navigation apparatus 53, even if the fixed IP address of the navigation apparatus 53 is not initially known. In addition, the mobile telephone 54 connects to the navigation apparatus 53 by using this acquired IP address, and can thereby remotely control the navigation apparatus 53 due to the driver operating the buttons of the mobile telephone 54. For example, the driver can set the destination before entering the automobile 2 by using the mobile telephone 54. This means that the driver is able to depart immediately rather than depart after entering the vehicle and then setting the destination.

(2) According to the present embodiment, the navigation apparatus 53 encrypts and sends the IP address. The mobile telephone 54 decrypts the encrypted IP address and acquires the IP address of the navigation apparatus 53. Therefore, it is possible to prevent the IP address from being mistakenly acquired by using the mobile telephone of a third party, and prevent the third party from thereby remotely controlling the navigation apparatus by using this IP address.

(3) According to the present embodiment, when a short message is received from the mobile telephone 54 corresponding to a telephone number that has been registered in advance in the navigation apparatus 53, the navigation apparatus 53 switches from a sleep mode to a wake-up mode. Therefore, even if a short message is sent to the navigation apparatus 53 from a mobile telephone that has not been registered in advance, the navigation apparatus 53 will not activate.

Note that each of the embodiments described above may be changed in the following manner.

In each of the embodiments described above, the IP address was encrypted, but the embodiment may be implemented without encrypting the IP address.

In each of the embodiments described above, the remote control of the navigation apparatuses 3 and 53 by the external terminals (mobile telephones 4 and 54) was carried out while the automobile 2 is stopped and the key is removed. However, this is not limiting, and the navigation apparatuses 3 and 53 may be remotely controlled from the external terminals (mobile telephones 4 and 54) while the automobile 2 is traveling.

In the first embodiment described above, after navigation apparatus 3 has been woken up from the sleep mode, the navigation apparatus 3 acquires the IP address that has been assigned to the navigation apparatus 3 from the control server 5*a*, and this IP address is sent to the external terminal (mobile telephone 4) by mail. In the case in which the navigation apparatus 3 is in wake-up mode and has already acquired the IP address, when there is activation data (a short message) from a registered external terminal (mobile telephone 4), the navigation module 13 may generate a mail that contains this already acquired IP address to the external terminal, and this IP address may or may not be encrypted.

In each of the embodiments described above, in addition to activation data for activating the navigation apparatuses 3 and 53 being generated, the matching between the identification data (telephone number) of the mobile telephones 4 and 54 and the identification data (telephone number) of the navigation apparatuses 3 and 53 is also included as a condition for switching the navigation apparatuses 3 and 53 to the wake-up mode. However, this may be implemented such that only the activation data being generated is the condition for wake-up.

In each of the embodiments described above, the communication configuration was a telephone network. However, this is not limiting, and the communication configuration may be the Internet.

In each of the embodiments described above, remote control of the setting of the destination by the navigation apparatus was disclosed with particular emphasis. However, this is not limiting, and the present invention may of course be applied in order to remotely control each of the functions that the navigation apparatus provides (for example, address searches, telephone searches, map display and the like).

The invention claimed is:

1. A navigation system comprising a navigation apparatus and an external terminal that remotely controls this navigation apparatus, wherein:
    the navigation apparatus comprises:
        a memory that stores in advance an electronic mail address of the external terminal;
        a navigation module that generates mail; and
        a communication control module that switches the navigation module from a sleep mode to a wake-up mode due to an ignition signal of an automobile or an activation signal from the external terminal;
    wherein the navigation module:
        determines whether the wake-up mode is due to the ignition signal or due to the activation signal; and
        acquires an IP address of the navigation apparatus when determined as being the wake-up mode is due to the activation signal, generates an electronic mail that contains this acquired IP address, and sends this electronic mail to the external terminal that sent the activation signal by using the electronic mail address of the external terminal.

2. The navigation system according to claim 1, wherein:
    the memory is a first memory;
    the navigation apparatus comprises:
        a second memory that stores in advance a fixed IP address of the navigation apparatus; and
    the navigation module reads and acquires the IP address that is stored in the second memory.

3. The navigation system according to claim 1, wherein:
    the navigation module acquires an assigned IP address from the external terminal that controls the navigation apparatus.

4. The navigation system according to claim 1, wherein:
    when it is determined that the wake-up mode is due to the activation signal, the navigation module:
        automatically acquires the IP address;
        automatically generates the mail that contains the acquired IP address; and
        automatically sends the mail to the external terminal that sent the activation signal by using the mail address of the external terminal.

5. A navigation apparatus enabling remote control by an external terminal, the navigation apparatus comprising:
    a memory that stores in advance an electronic mail address of the external terminal;
    a navigation module; and
    a communication control module that switches the a navigation module from a sleep mode to a wake-up mode due to an ignition signal of an automobile or an activation signal from the external terminal;
    wherein the navigation module:
        determines whether the wake-up mode is due to the ignition signal or the activation signal; and
        acquires an IP address when determined as being the wake-up mode is due to the activation signal, generates an electronic mail containing this acquired IP address of the navigation apparatus, and sends this electronic mail to the external terminal that sent the activation signal by using the electronic mail address of the external terminal.

6. The navigation apparatus according to claim 5, wherein:
    the memory is a first memory;
    the navigation apparatus comprises a second memory that stores a fixed IP address of the navigation apparatus; and
    the navigation module reads and acquires the IP address that is stored in the second memory.

7. The navigation apparatus according to claim 5, wherein:
    the navigation module acquires an assigned IP address from the external terminal that controls the navigation apparatus.

8. The navigation apparatus according to claim 5, wherein:
    when it is determined that the wake-up mode is due to the activation signal, the navigation module:
        automatically acquires the IP address;
        automatically generates the mail that contains the acquired IP address; and
        automatically sends the mail to the external terminal that sent the activation signal by using the mail address of the external terminal.

* * * * *